(12) United States Patent (10) Patent No.: US 8,118,264 B2
Mabe et al. (45) Date of Patent: Feb. 21, 2012

(54) SHAPE MEMORY ALLOY ACTUATOR

(75) Inventors: James H. Mabe, Seattle, WA (US);
Frederick T. Calkins, Renton, WA (US);
Glenn S. Bushnell, Puyallup, WA (US);
Stefan R. Bieniawski, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/960,271

(22) Filed: Dec. 3, 2010

(65) Prior Publication Data
US 2011/0101170 A1 May 5, 2011

Related U.S. Application Data

(62) Division of application No. 11/771,489, filed on Jun. 29, 2007, now Pat. No. 7,878,459.

(51) Int. Cl.
*B64C 9/00* (2006.01)
(52) U.S. Cl. ........ 244/213; 244/214; 244/215; 244/99.8
(58) Field of Classification Search .................. 244/213, 244/214, 215, 99.8, 75.1
See application file for complete search history.

(56) References Cited

U.S. PATENT DOCUMENTS

| | | | | |
|---|---|---|---|---|
| 5,752,672 A * | 5/1998 | McKillip, Jr. | | 244/99.8 |
| 5,887,828 A * | 3/1999 | Appa | | 244/215 |
| 6,209,824 B1 * | 4/2001 | Caton et al. | | 244/213 |
| 6,220,550 B1 * | 4/2001 | McKillip, Jr. | | 244/215 |
| 6,427,948 B1 * | 8/2002 | Campbell | | 244/204.1 |
| 7,429,074 B2 * | 9/2008 | McKnight et al. | | 296/180.1 |
| 7,896,294 B2 * | 3/2011 | Dittrich | | 244/219 |
| 7,901,524 B1 * | 3/2011 | McKnight et al. | | 148/563 |
| 2001/0006207 A1 * | 7/2001 | Caton et al. | | 244/213 |
| 2001/0010348 A1 * | 8/2001 | Bilanin et al. | | 244/215 |
| 2006/0169837 A1 * | 8/2006 | Bird et al. | | 244/99.8 |
| 2006/0266884 A1 * | 11/2006 | Perlman | | 244/99.8 |
| 2008/0035788 A1 * | 2/2008 | Kothera et al. | | 244/99.8 |

* cited by examiner

*Primary Examiner* — Christopher P Ellis

(57) ABSTRACT

An aircraft system may include an airfoil and a deployable device coupled to the airfoil. The system may further include a shape memory alloy actuator coupled between the airfoil and the deployable device. The actuator may be movable between a first position with the deployable device deployed relative to the airfoil, and a second position with the deployable device stowed relative to the airfoil. The system may additionally include an activatable link positioned between the actuator and the deployable device. The link may have an engaged configuration in which motion of the actuator is transmitted to the deployable device, and a disengaged configuration in which motion of the actuator is not transmitted to the deployable device.

20 Claims, 8 Drawing Sheets

SHAPE MEMORY ALLOY ACTUATOR

CROSS-REFERENCE TO RELATED APPLICATIONS

The present application is a divisional of and claims priority to pending application Ser. No. 10/771,489 entitled AIRCRAFT SYSTEMS WITH SHAPE MEMORY ALLOY (SMA) ACTUATORS AND ASSOCIATED METHODS filed on Jun. 29, 2007, the entire contents of which is incorporated by reference herein.

FIELD

The present disclosure is directed generally to aircraft systems with shape memory alloy (SMA) actuators, and associated methods.

BACKGROUND

Shape memory alloys (SMA) form a group of metals that have useful thermal and mechanical properties. If an SMA material such as Nitinol is deformed while in a martensitic state (low yield strength condition) and then heated to its transition temperature to reach an austenitic state, the SMA material will resume its austenitic shape. The rate of return to the austenitic shape depends upon the amount and rate of thermal energy applied to the component.

SMA actuators have proven useful in a wide variety of contexts, including aircraft-related contexts, to actuate particular devices. However, the SMA actuators have, in at least some instances, proved challenging to control. In other instances, the integration of SMA actuators has proved challenging. Accordingly, there exists a need in the art for improved techniques for integrating SMA actuators into aircraft systems, and controlling such actuators

SUMMARY

Aspects of the present disclosure are directed to aircraft systems with shape memory alloy (SMA) actuators, and associated methods. An aircraft system in accordance with a particular embodiment includes an airfoil and a deployable device coupled to the airfoil with a hinge. The hinge has a load path supporting the deployable device relative to the airfoil. The system can further include an SMA actuator coupled between the airfoil and the deployable device, with the actuator being moveable along a motion path different than the hinge load path between a first position with the deployable device deployed relative to the airfoil, and a second position with the deployable device stowed relative to the airfoil. In particular embodiments, the deployable device can include a secondary trailing edge device that depends from a primary trailing edge device. In further particular embodiments, the deployable device can include a noise-reduction hinge tab that deploys from a helicopter rotor.

In still another embodiment, the system can include an activatable link positioned between the actuator and the deployable device, with the link having an engaged configuration in which motion of the actuator is transmitted to the deployable device, and a disengaged configuration in which motion of the actuator is not transmitted to the deployable device. For example, in a particular embodiment, the activatable link includes a clutch. In another embodiment, the activatable link includes a rotary spline having first spline elements and second spline elements, with the first and second elements rotatable relative to each other over a first angular range, and rotating together over a second rotational range.

Other aspects are directed to methods for operating an airfoil. One method includes supporting a deployable device relative to an airfoil with a hinge having a hinge load path, and moving the deployable device relative to the airfoil by activating an SMA actuator coupled between the airfoil and the deployable device. Activating the actuator can include moving the actuator along a motion path different than the hinge load path. A method in accordance with another embodiment includes using a selectively activatable link to engage an SMA actuator with the deployable device and move the deployable device during a first mode of operation, and disengage the SMA actuator from the deployable device during a second mode of operation, while the actuator is activated.

The features, functions and advantages that have been discussed can be achieved independently in various embodiments of the present disclosure or may be combined in yet other embodiments, further details of which can be seen with reference to the following description and drawings below.

DETAILED DESCRIPTION

The following disclosure is directed generally toward aircraft systems with shape memory alloy (SMA) actuators, and associated methods. Several details describing structures and/or processes that are well-known and often associated with aspects of the systems and methods are not set forth in the following description for purposes of brevity. Moreover, although the following disclosure sets forth several embodiments of representative aspects of the disclosure, several other embodiments can have different configurations or different components than those described in this section. For example, other embodiments may have additional elements and/or may delete several of the elements described below with reference to FIGS. 1-10D.

Figure 1:
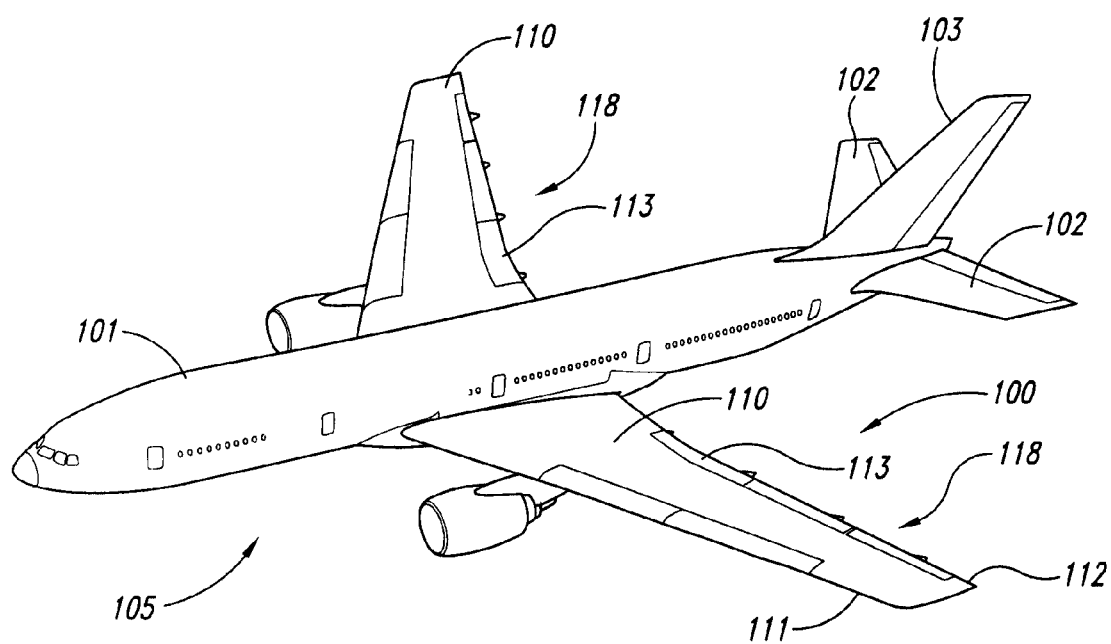
FIG. 1 is partially schematic, isometric illustration of an overall system that includes an aircraft with one or more deployable devices installed in accordance with an embodiment of the disclosure.

FIG. 1 illustrates an aircraft 105 that can form a portion of an overall aircraft system 100. The aircraft 105 includes a fuselage 101, wings 110, horizontal stabilizers 102, and a vertical stabilizer 103. Any of these components can include deployable devices, but for purposes of illustration, selected deployable devices are described further below in the context of trailing edge devices mounted to the wings 110. The wings 110 can each include a leading edge 111, a trailing edge 112, and one or more trailing edge devices 118 (e.g., flaps 113, ailerons, or flaperons) carried at the trailing edge 112. The trailing edge devices 118, which are themselves deployable relative to the wing 110, can include further deployable devices that are driven by SMA actuators, as described in further detail below. For purposes of illustration, the following discussion is provided in the context of a trailing edge flap 113. In other embodiments, some or all aspects of the components described below can be applied to other trailing edge devices 118, and/or other non-trailing edge devices.

Figure 2A:
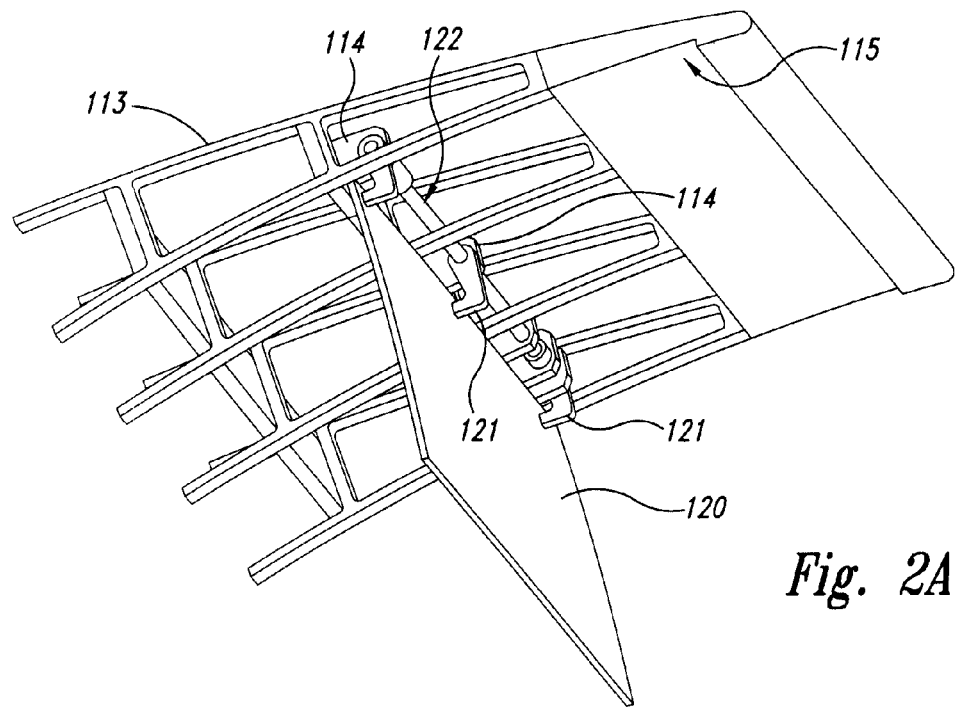
FIG. 2A is a partially schematic, bottom isometric illustration of a deployable device and an SMA actuator configured in accordance with an embodiment of the disclosure.

FIG. 2A is a bottom isometric illustration of the aft portion of one of the trailing edge flaps 113 shown in FIG. 1. For purposes of illustration, portions of the external skin of the trailing edge flap 113 are removed. The trailing edge flap 113 includes a deployable device 120 (e.g., a "mini" or other secondary trailing edge device) that is carried toward the aft edge of the trailing edge flap 113. The trailing edge flap 113 accordingly includes a deployable device receptacle 115 that receives the deployable device 120 in a stowed position. An SMA actuator 122 is coupled to the deployable device 120 to move it between its deployed position (shown in FIG. 2) and its stowed position. Accordingly, the SMA actuator 122 can be connected between one or more flap brackets 114 carried by the trailing edge flap 113, and one or more device brackets 121 carried by the deployable device 120.

Figure 2B:
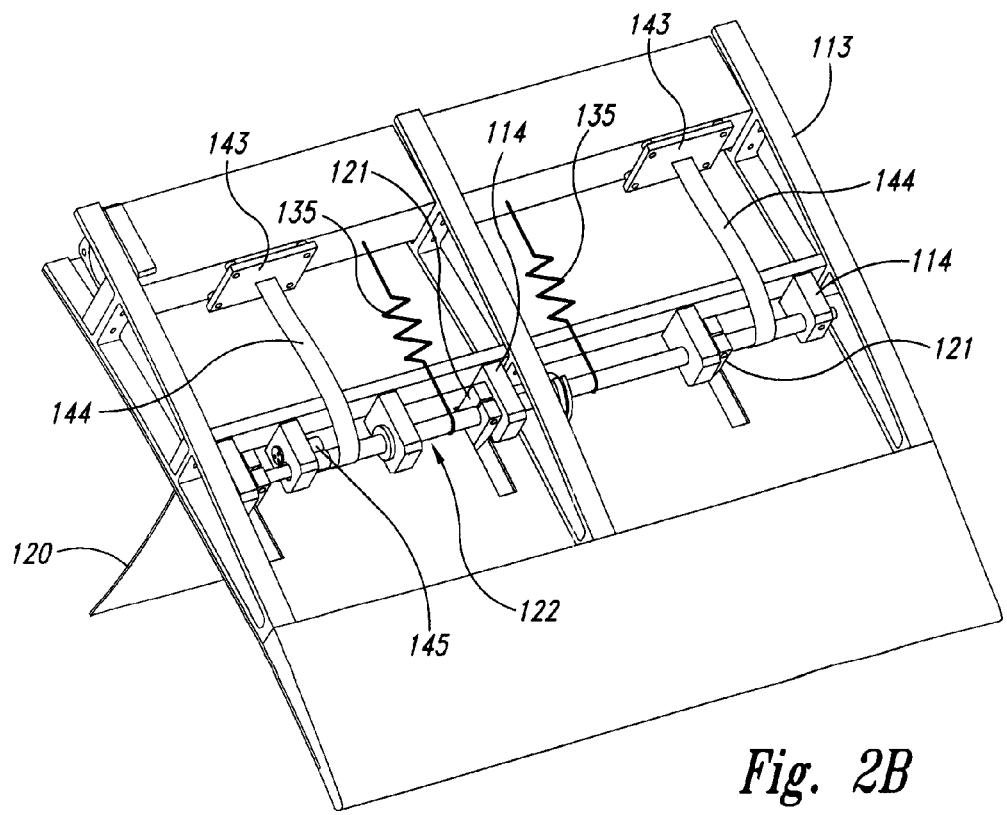
FIG. 2B is a partially schematic top isometric illustration of an embodiment of the arrangement shown in FIG. 2A, along with additional components.

FIG. 2B is a top isometric illustration of the arrangement shown in FIG. 2A, along with additional components. These components can include return springs 135 (shown schematically) that bias the deployable device 120 toward either the stowed or deployed position (generally the stowed position). The arrangement can also include one or more thermoelectric modules 143 coupled to the SMA actuator 122 with thermally conductive couplings 144 (e.g., copper straps) to cool the actuator 122. One or more position sensors 145 can be used for diagnostic purposes to identify the position of the deployable device 120.

Figure 3:
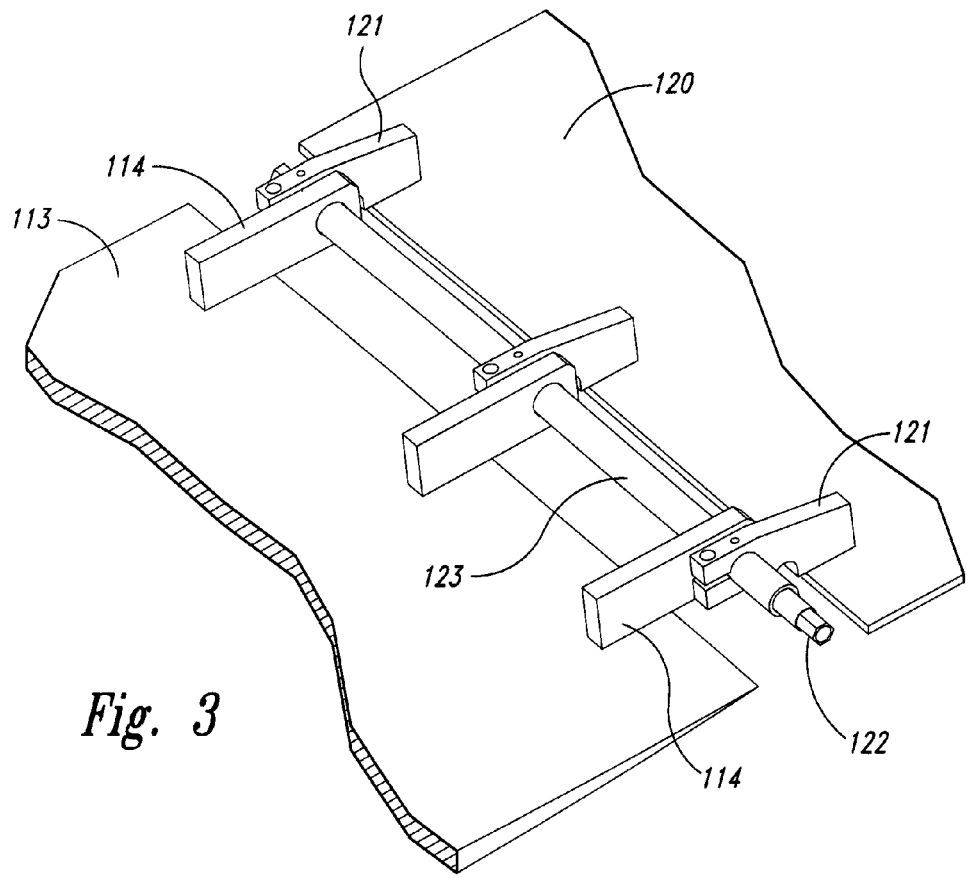
FIG. 3 is a partially schematic, isometric illustration of a connection arrangement between an SMA actuator and a deployable device in accordance with an embodiment of the disclosure.

FIG. 3 is a partially schematic illustration of the aft portion of the trailing edge flap 113, and the forward portion of the deployable device 120. As shown in FIG. 3, a hinge pin 123 passes through, and is rotatable relative to, a plurality of flap brackets 114. The hinge pin 123 can be fixedly clamped to the device brackets 121. Accordingly, the hinge pin 123 can rotate with the deployable device 120, and rotate relative to the trailing edge flap 113. In other embodiments, this arrangement can be reversed. In any of these embodiments, the SMA actuator 122 can be carried within an axially extending opening of the hinge pin 123 to drive the deployable device 120 relative to the trailing edge flap 113. Further details of a representative embodiment for arranging the SMA actuator 122 and the hinge pin 123 are described below with reference to FIG. 4.

Figure 4:
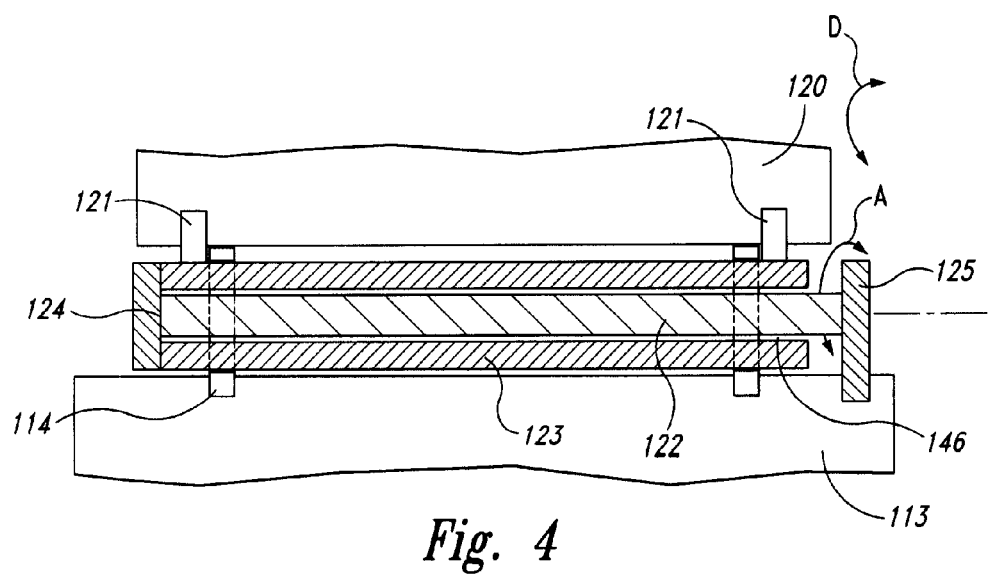
FIG. 4 is a partially schematic, cross-sectional illustration of an embodiment of the connection arrangement shown in FIG. 3.

FIG. 4 is a partially schematic, top cross-sectional illustration of embodiments of the system portions shown in FIG. 3. As shown in FIG. 4, the hinge pin 123 is fixedly attached to the device brackets 121, and is rotatable within apertures of the flap brackets 114. For purposes of illustration, bearings (e.g., ball bearings) and/or other features that support the relative rotation of the hinge pin 123 are not shown in FIG. 4. The SMA actuator 122 is received in an annular channel 146 of the hinge pin 123 and is attached at one end to an actuator support 125. The opposite end of the SMA actuator 122 is attached to the hinge pin 123, e.g., at an actuator/hinge pin connection 124. When the SMA actuator 122 is heated (e.g., by applying an electrical current to the actuator 122), it tends to twist, as indicated by arrow A. Because one end of the SMA actuator 122 is fixed relative to the trailing edge flap 113, the twisting motion of the SMA actuator 122 rotates the hinge pin 123 relative to the trailing edge flap 113. This motion in turn rotates the deployable device 120 relative to the trailing edge flap 113, as indicated by arrow D. In a particular arrangement, the deployable device 120 is in its stowed position when the SMA actuator 122 is inactive (e.g., cooled), and rotates to its deployed position when the SMA actuator is activated (e.g., heated). In other embodiments, the SMA actuator 122 can be configured in the opposite sense.

In any of the foregoing embodiments described above with reference to FIGS. 3 and 4, the deployable device 120 can be carried and supported relative to the trailing edge flap 113 via a hinge load path, and the deployable device 120 can be moved relative to the trailing edge flap 113 along a motion path that is different, at least in part, than the load path. For example, as shown in FIG. 4, the load path supporting the deployable device 120 relative to the trailing edge flap 113 includes the device brackets 121, the hinge pin 123, and the flap brackets 114. The motion path between the deployable device 120 and the trailing edge flap includes the device brackets 121, the hinge pin 123, the SMA actuator 122, and the actuator support 125. An advantage of this arrangement is that the deployable device 120 will remain attached to the trailing edge flap 113, even in the unlikely event of a complete failure of the SMA actuator 122. For example, if the SMA actuator 122 were to fracture in such a way that it no longer provides mechanical continuity between the actuator support 125 and the hinge pin 123, the flap brackets 114 still provide a continuous load path between the deployable device 120 and the trailing edge flap 113. The load path provided by the flap brackets 114 can accordingly provide a fail-safe connection between the trailing edge flap 113 and the deployable device 120.

One characteristic of SMA actuators that has proved challenging to designers is the fact that many SMA actuators have different response characteristics over different portions of their actuation ranges. For example, typical SMA actuators may move relatively slowly at the beginning of the actuation range, move more quickly in the middle of the range, and then slow down again toward the end of the range. Another characteristic of many SMA actuators is that, once activated, they require power to remain in their actuated positions. Particular embodiments of systems that address both of these challenges are described below.

Figure 5:
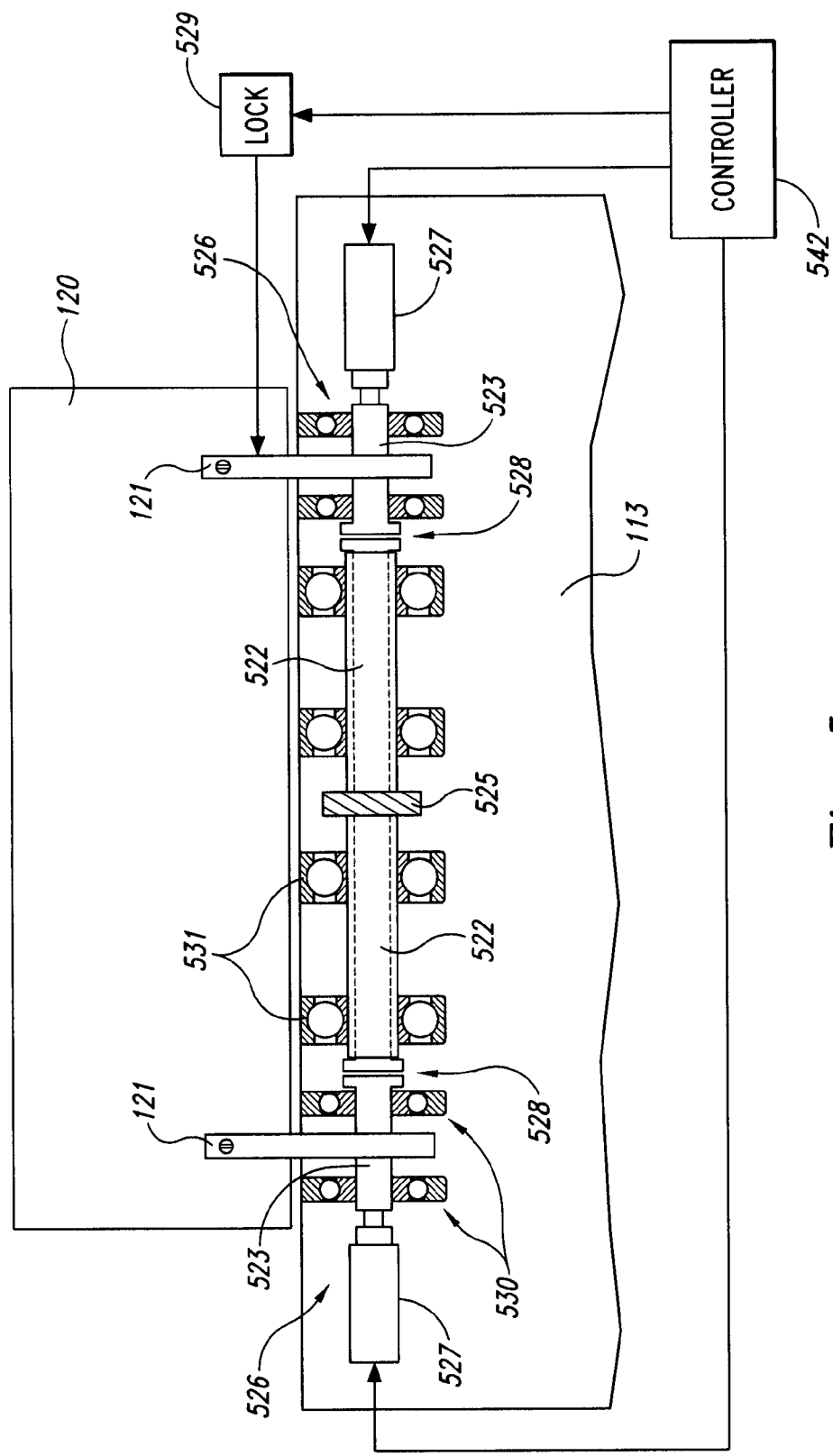
FIG. 5 is a partially schematic, plan view illustration of an SMA actuator coupled to a deployable device with an activatable link in accordance with an embodiment of the disclosure.

FIG. 5 is a partially schematic, partial cross-sectional top plan view of the deployable device 120 coupled to the trailing edge flap 113 with one or more activatable links 526 configured in accordance with an embodiment of the disclosure. In this embodiment, two SMA actuators 522 are coupled between the trailing edge flap 113 and the deployable device 120. In one particular embodiment, each SMA actuator 522 rotates in the same direction when actuated, and accordingly, the two SMA actuators 522 can provide a redundant actuation capability. In other embodiments, each of the SMA actuators 522 can rotate the deployable device 120 in opposite directions. Accordingly, one SMA actuator 522 can be used to deploy the deployable device 120, and the other can be used to stow the deployable device 120. In either of these arrangements, the SMA actuators 522 are connected to an actuator support 525 that is fixed relative to the trailing edge flap 113. The motion of the SMA actuators 522 is then selectively transmitted to the deployable device 120 via two corresponding activatable links 526. In a first mode of operation, the activatable links 526 transmit motion of the actuators 522 to the deployable device 120, and in a second mode of operation, they do not, as described further below.

Each activatable link 526 can include a pin 523 connected at one end to a solenoid 527, and at the other end to a clutch 528 that selectively engages with the neighboring SMA actuator 522. Pin bearings 530 support the pin 523, and actuator bearings 531 support the SMA actuator 522. In a particular embodiment, the pin 523 is slidable relative to the device bracket 122 through which it passes, but is not rotatable relative to the device bracket 121. For example, the hinge pin 523 can include splines that are slideably received in a corresponding opening in the device bracket 121. When the clutch 528 is disengaged (as shown in FIG. 5), the motion of each SMA actuator 522 is not transmitted to the deployable device 520. When the solenoid 527 is activated, the clutch 528 engages, and the motion of the SMA actuator 522 is transmitted to the deployable device 120. In this manner, the clutch 528 can be disengaged while the SMA actuator 522 is moving slowly (e.g., toward the start and/or end of its motion range), and can be engaged when the SMA actuator is moving more quickly (e.g., in the middle of its motion range). A controller 542 can automatically control the solenoids 527 (and therefore the state of the corresponding clutches 528) to take advantage of the quickest portion of the actuator motion range.

The controller 542 can also be coupled to a lock 529 that selectively engages the deployable device 120, or a component fixedly attached to the deployable device 120 (e.g., the device bracket 121). Accordingly, the SMA actuators 522 can be used to drive the deployable device 120 to its deployed position, and then the lock 529 can engage the deployable device 120 and prevent (or at least restrict or inhibit) it from returning to its stowed position. The controller 542 can then discontinue power to the SMA actuators 522, allowing the SMA actuators 522 to return to their "relaxed" state, which does not require power. When the deployable device 120 is to be returned to its stowed position, the lock 529 can be disengaged and the SMA actuators 522 and/or a spring device (e.g., the return springs 135 shown in FIG. 2B) can return the deployable device 120 to its stowed position. Further details of a representative arrangement for executing these processes are described with reference to FIGS. 10A-10D.

Figure 6:
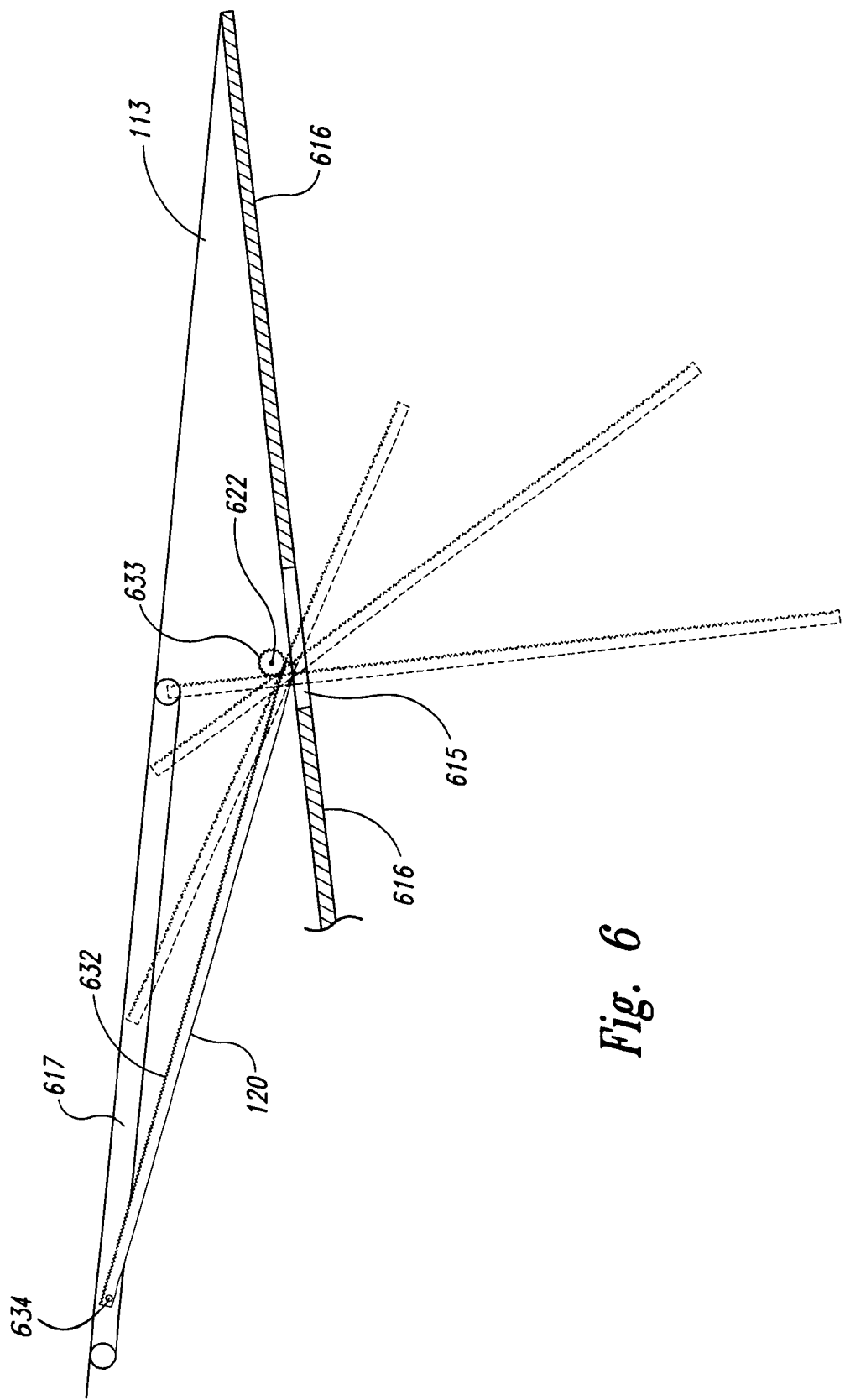
FIG. 6 is a partially schematic, side elevation view of a deployable device coupled to an SMA actuator with a rack and pinion arrangement in accordance with another embodiment of the disclosure.

FIG. 6 illustrates a deployable device 120 driven by an SMA actuator 622 in accordance with another embodiment of the disclosure. In one aspect of this embodiment, the deployable device 120 is carried by a trailing edge flap 113 having a flap lower surface 616 with a gap 615 through which the deployable device 120 emerges when deployed. The deployable device 120 has a guide pin 634 that moves along a guide track 617 carried by the trailing edge flap 113, forming a sliding hinge arrangement. The deployable device 120 also includes a rack 632 that engages with a pinion 633 carried by the trailing edge flap 113. A roller or other device (not shown in FIG. 6) can apply a force to the deployable device 120 to keep it engaged with the pinion 633. In another embodiment, the pinion 633 is positioned below the deployable device 120, and gravity provides the force described above. In any of these embodiments, the pinion 633 can be connected to, and rotated by, the SMA actuator 622. Accordingly, when the SMA actuator 622 is activated, it rotates the pinion 633, which in turn moves the deployable device 120 into and out of the receptacle 615 by engaging with and driving the rack 632. Any of the foregoing arrangements for selectively actuating the SMA actuator 622 and/or locking the SMA actuator 622 can be included in the arrangement shown in FIG. 6. In the unlikely event that the SMA actuator 622 fails, the deployable device 120 can remain secured to the trailing edge flap because the guide pin 634 remains engaged with the guide track 617.

SMA actuator arrangements having characteristics similar at least in part to the embodiments described above can be coupled to other types of airfoils, and/or can have different arrangements in other embodiments. For example, FIGS. 7-10D illustrate portions of a rotor blade 710 having deployable devices 720 arranged in accordance with one such embodiment. Beginning with FIG. 7, the rotor blade 710 can include two deployable devices 720, e.g., a first deployable device 720a which is visible in FIG. 7, and a second deployable device 720b described below with reference to FIG. 8. The deployable devices 720 can be deployed from the rotor blade 710 to reduce rotor noise, for example, during hover operations in environments having stringent noise attenuation requirements. The deployable devices 720 can be operated with rotary SMA actuators, as is described further below.

Figure 7:
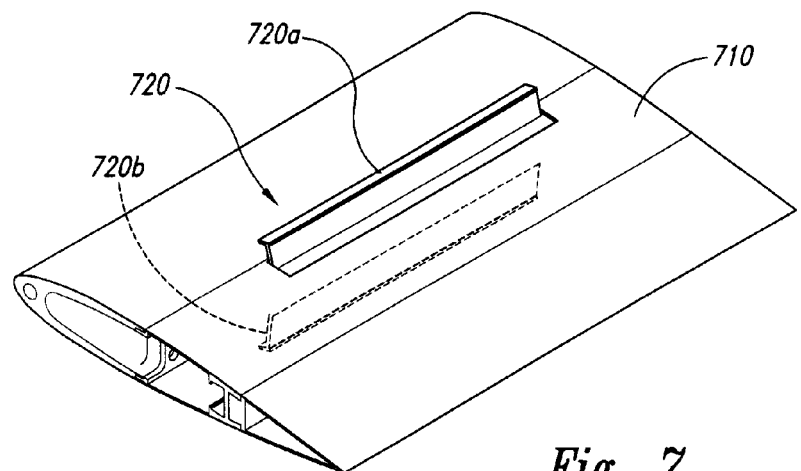
FIG. 7 is a top isometric illustration of a rotor blade that includes multiple deployable devices in accordance with an embodiment of the disclosure.
Figure 8:
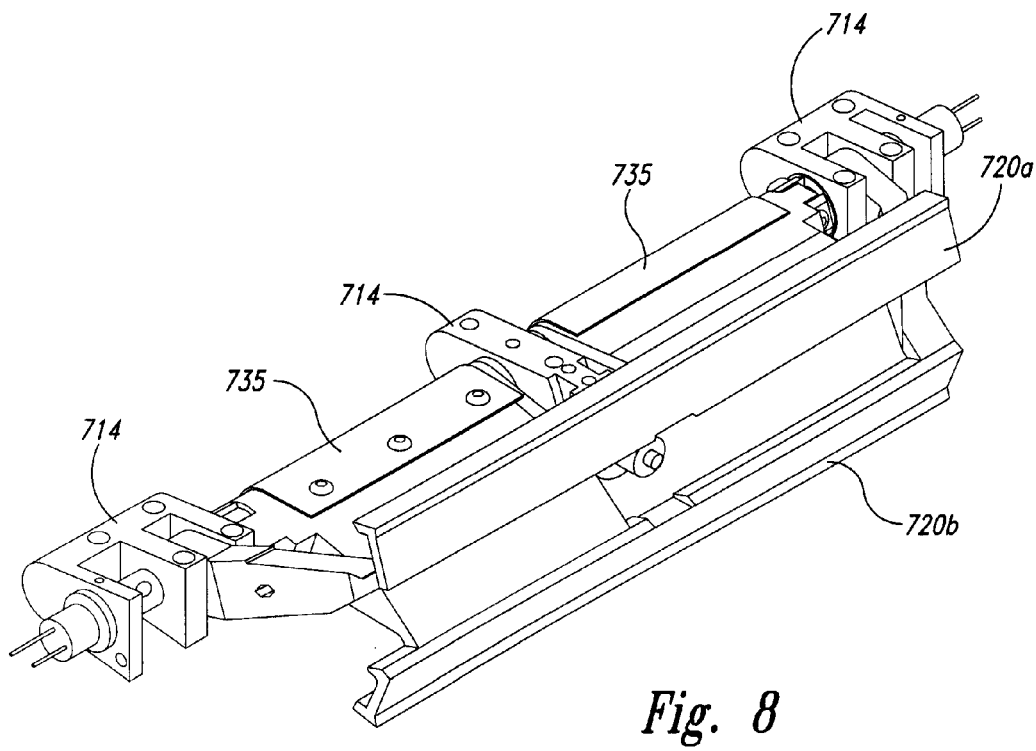
FIG. 8 is a partially schematic, isometric illustration of the deployable devices shown in FIG. 7.

FIG. 8 is a partially schematic, isometric illustration of the first and second deployable devices 720a, 720b and associated hardware, removed from the rotor blade 710 shown in FIG. 7. The deployable devices 720a, 720b are supported relative to the rotor blade 710 with blade brackets 714. Return springs 735 can return the deployable devices 720a, 720b to their stowed positions without the need for simultaneously activating a corresponding SMA actuator, as is described further below.

Figure 9:
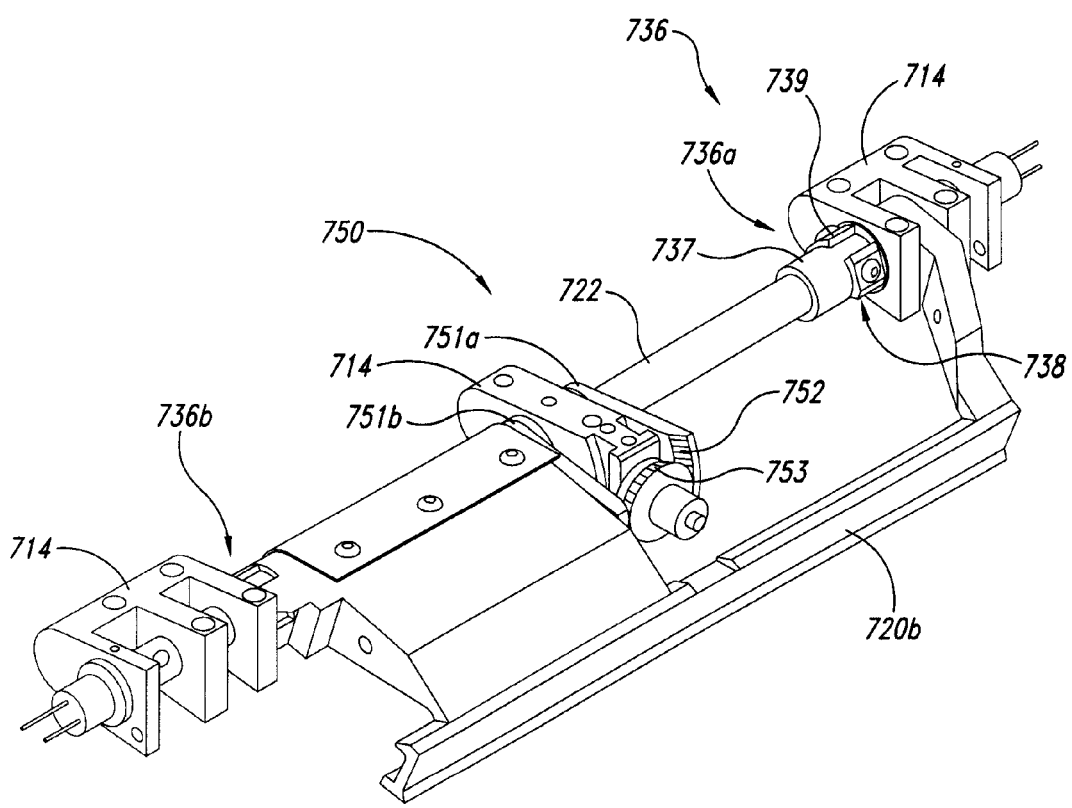
FIG. 9 is a partially schematic, isometric illustration of an SMA actuator and associated connections with the deployable devices shown in FIG. 8.

FIG. 9 is another isometric view of the arrangement shown in FIG. 8, with the first deployable device 720a removed to expose internal features of the arrangement. The arrangement includes a single SMA actuator 722 that is free to rotate with respect to the blade brackets 714. The SMA actuator 722 is coupled toward opposing ends to corresponding drivers 736 (including a first driver 736a that is visible in FIG. 9 and a second driver 736b that is not visible in FIG. 9). A connector shaft 737 provides the connection between the SMA actuator 722 and the drivers 736a, 736b. The connector shaft 737 also extends through the blade brackets 714 so that if the SMA actuator 722 fails, the corresponding deployable device is still carried in position relative to the rotor blade 710 (FIG. 7).

In a particular embodiment, each driver 736 includes a spline 738 having at least one first spline element 739 that selectively engages with a corresponding spline element carried by one of the deployable devices 720a, 720b. As the SMA actuator 722 twists about its longitudinal axis, the first and second drivers 736a, 736b rotate in opposite directions. During at least a portion of this relative movement, the drivers 736a, 736b move the corresponding deployable devices 720a, 720b in opposite directions. The motion of the two devices 720a, 720b is coordinated by a motion coordinator 750. In a particular embodiment, the motion coordinator 750 can include first and second opposing coordination arms 751a, 751b, each of which is carried by a corresponding one of the deployable devices 720a, 720b (e.g., the second coordination arm 751b is carried by the second deployable device 720b). Each coordination arm 751a, 751b includes a rack 752 that engages with a centrally located pinion 753. When one of the deployable device, 720a, 720b moves, the pinion 753 transmits the motion to other deployable device 720a, 720b so as to move the other deployable device by the same amount in the opposite direction.

Figure 10A:
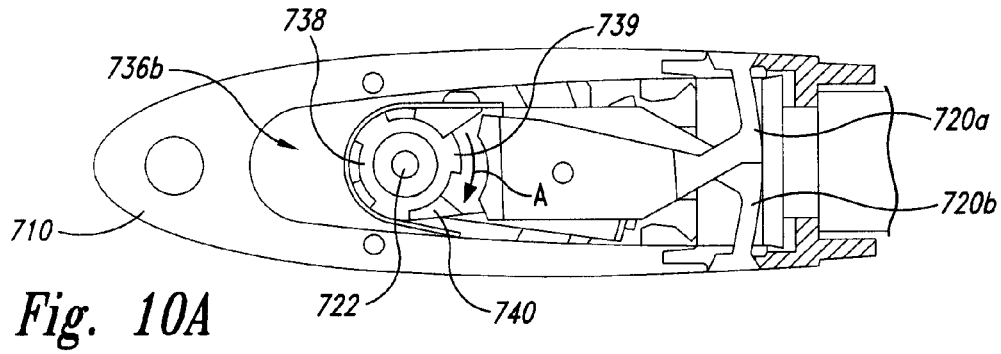
FIGS. 10A-10D illustrate phases of operation of the actuator arrangement shown in FIGS. 7-9.
Figure 10B:
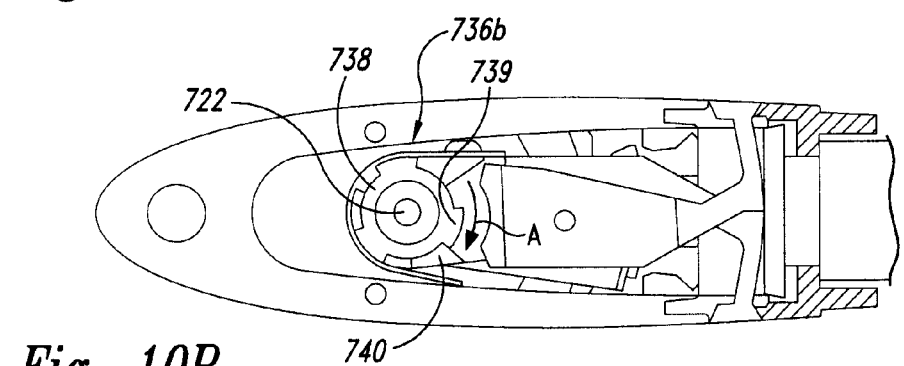
Figure 10C:
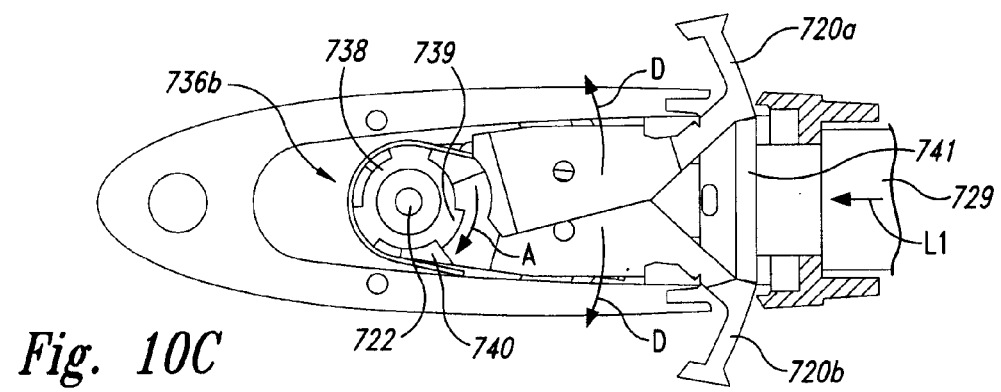
Figure 10D:
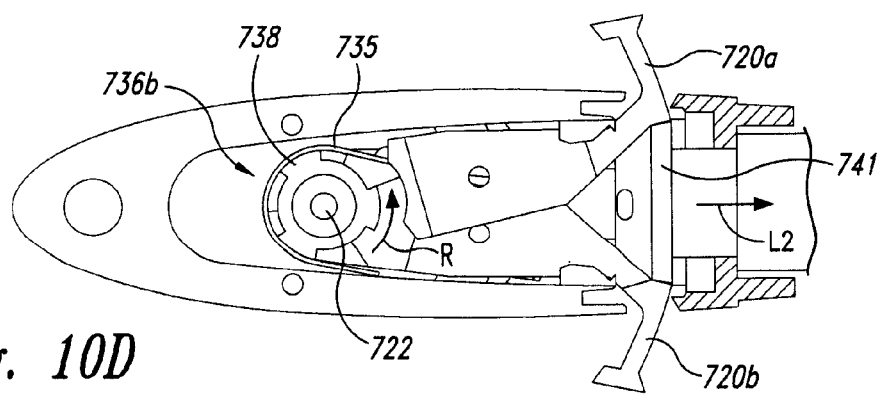

FIGS. 10A-10D are partially schematic, cross-sectional illustrations of the rotor 710, showing the SMA actuator 722 and the second driver 736b of FIG. 9A during various phases of operation. As shown in FIG. 10A, the second driver 736b includes a spline 738 having a first spline element 739. As the SMA actuator 722 twists, the first spline element 739 rotates as indicated by arrow A until it engages a corresponding second spline element 740 carried by the second deployable device 720b (FIG. 10B). If the first driver 736a (FIG. 9) has not yet engaged with a corresponding second spline element carried by the first deployable device 720a (FIG. 9), then in a particular embodiment, the SMA actuator 722 continues to twist without further rotating the second driver 736b. When, for both the first and second drivers 736a, 736b, the first spline element 739 engages the corresponding second spline element 740 (as shown in FIG. 10C), continued twisting by the SMA actuator 722 causes the first deployable device 720a and the second deployable device 720b to rotate away from each other, as indicated by arrows D. This motion is coordinated by the motion coordinator 750 described above with reference to FIG. 9.

At the end of the relative motion between the first and second deployable devices 720a, 720b, a lock 729 can deploy a lock element 741, as indicated by arrow $L_1$, to hold the deployable devices 720a, 720b in their deployed positions or at least inhibit motion of the deployable devices 720a, 720b. With the lock element 741 in this first or locked position, the SMA actuator 722 can unwind or relax, as indicated by arrow R in FIG. 10D. At the same time, the deployed lock element 741 can maintain the first and second deployable devices 720a, 720b in their deployed positions. When it is desired to retract the deployable devices 720a, 720b, the lock element 741 can retract to a second or unlocked position, as indicated by arrow $L_2$ in FIG. 10D. The return springs 735 (one of which is visible in FIG. 10D) can then return the deployable devices 720a, 720b to the configuration shown in FIG. 10A.

One feature of several of the foregoing embodiments is that the motion path and load path between the deployable device and the structure from which it depends are separate. An advantage of this arrangement is that the SMA actuator can fail, without causing the deployable device to separate from the structure that carries it. In a particular arrangement, the SMA actuator can be housed, at least in part, in an axial channel of a hinge pin that connects the deployable device to an associated support structure. This configuration can provide the added advantage of a nested, compact arrangement.

Another feature of at least some of the foregoing embodiments is that the SMA actuator can be selectively coupled to and decoupled from the deployable device, for example, with a clutch, a selectively engaged spline, or other arrangement. An advantage of these arrangements is that the deployable device can be selectively coupled to the SMA actuator during particular motion phases of the SMA actuator. For example, the deployable devices can be coupled to the SMA actuators only during those portions of the SMA actuator's motion that are at or above a selected threshold speed. This arrangement can avoid low speed deployment or retraction of the deployed devices.

Still another feature of at least some of the foregoing embodiments is that they can include a selectively deployable lock that keeps the deployed device in a particular position (e.g., a stowed position) even if the SMA actuator is unpowered. This arrangement can reduce the amount of power consumed by the SMA actuator. It can also reduce the time required to reposition the deployed device. For example, when the deployed device is provided with a return spring or other return mechanism, it can move to the stowed position more quickly than if the return motion were controlled by the cooling rate of the SMA actuator.

Representative materials suitable for manufacturing SMA actuators in accordance with any of the embodiments described above include Nitinol. In a particular embodiment, the Nitinol can be 55% by weight nickel and 45% by weight titanium. In a further particular embodiment, the Nitinol can have an equi-atomic composition, with 50% nickel molecules and 50% titanium molecules. Suitable materials are available from Special Metals Corp. of New Hartford, N.Y., and Wah Chang of Albany, Oreg. The material is then machined, heat treated and trained. The resulting structure can display shape memory effects, including a two-way shape memory effect. Further details of suitable manufacturing processes and resulting structures are included in pending U.S. Application Publication US2005-0198777, assigned to the assignee of the present application and incorporated herein by reference. Other suitable materials include Nitinol with 57% or 60% nickel by weight, and/or nickel/titanium alloys with additional constituents (e.g., palladium and/or platinum) to increase the transition temperature, and/or to attain other material properties.

From the foregoing, it will be appreciated that specific embodiments have been described herein for purposes of illustration, but that various modifications may be made in other embodiments. For example, the SMA actuators and couplings described above can have other features and arrangements in other embodiments. The SMA actuators can be used to drive devices other than the mini trailing edge devices and rotor tabs described above, including other secondary trailing edge devices that are attached to a primary trailing edge device (e.g., a double-slotted trailing edge device). In still further embodiments, the SMA actuators can have an actuation motion path other than the rotary or twisting motion path described above (e.g., a linear motion path).

Certain aspects described in the context of particular embodiments may be combined or eliminated in other embodiments. For example, the lock arrangement described above with reference to FIGS. 7-10D can be modified and incorporated into the device shown in FIG. 5. Further, while advantages associated with certain embodiments have been described in the context of those embodiments, other embodiments may also exhibit such advantages, and not all embodiments need necessarily exhibit such advantages. Accordingly, embodiments of the disclosure are not limited except as by the appended claims.

What is claimed is:

1. An aircraft system, comprising:
   an airfoil;
   a deployable device coupled to the airfoil;
   a shape memory alloy actuator coupled between the airfoil and the deployable device, the actuator being movable between a first position with the deployable device deployed relative to the airfoil, and a second position with the deployable device stowed relative to the airfoil; and
   an activatable link positioned between the actuator and the deployable device, the link having an engaged configuration in which motion of the actuator is transmitted to the deployable device, and a disengaged configuration in which motion of the actuator is not transmitted to the deployable device.

2. The system of claim 1 wherein:
the actuator is movable along a rotary motion path.

3. The system of claim 2 wherein:
the actuator is twistable relative to at least one of the airfoil and the deployable device along the rotary motion path.

4. The system of claim 3 further comprising:
a hinge coupled between the airfoil and the deployable device;
the hinge including a hinge pin having an elongated opening;
the shape memory alloy actuator being positioned within the opening to twist along the motion path.

5. The system of claim 4 wherein:
the shape memory alloy actuator having a first end fixed to the hinge pin and a second end fixed to the airfoil.

6. The system of claim 1 further comprising:
a hinge coupled between the airfoil and the deployable device, the hinge defining a hinge load path supporting the deployable device relative to the airfoil.

7. The system of claim 1 wherein:
the actuator has a range of motion;
the activatable link coupling the actuator to the deployable device over a first portion of the range of motion and not over a second portion of the range of motion.

8. The system of claim 1 wherein:
the activatable link includes a rotary spline having first spline elements and second spline elements;
the first and second spline elements being disengaged and rotatable relative to each other over a first angular range;
the first and second spline elements being engaged and rotatable together over a second rotational range.

9. The system of claim 1 further comprising:
an activatable lock coupled between the deployable device and the airfoil;
the lock having a locked configuration in which the deployable device has a fixed position relative to the airfoil, and an unlocked configuration in which the deployable device is movable relative to the airfoil.

10. The system of claim 1 wherein:
the airfoil comprises a wing of an aircraft;
the deployable device comprises at least one of a trailing edge device coupled to the wing.

11. An aircraft system, comprising:
an airfoil;
a trailing edge device coupled to the airfoil;
a shape memory alloy actuator coupled between the airfoil and the trailing edge device, the actuator being movable between a first position with the trailing edge device deployed relative to the airfoil, and a second position with the trailing edge device stowed relative to the airfoil; and
an activatable link positioned between the actuator and the trailing edge device, the link having an engaged configuration in which motion of the actuator is transmitted to the trailing edge device, and a disengaged configuration in which motion of the actuator is not transmitted to the trailing edge device.

12. A method for deploying a deployable device, comprising the steps of:
supporting the deployable device relative to an airfoil;
activating a shape memory alloy actuator coupled between the airfoil and the deployable device;
twisting the shape memory alloy actuator along a rotary motion path; and
moving the deployable device relative to the airfoil in response to twisting the shape memory alloy actuator.

13. The method of claim 12 wherein the step of twisting the actuator comprises:
twisting the actuator relative to at least one of the airfoil and the deployable device.

14. The method of claim 13 wherein the step of twisting the actuator comprises:
heating the actuator; and
twisting the actuator in response to the heating thereof.

15. The method of claim 12 wherein the deployable device is supported on the airfoil by a hinge defining a hinge load path, the method further comprising the step of:
moving the actuator along a motion path that is different than the hinge load path.

16. A method for deploying a deployable device, comprising the steps of:
supporting the deployable device relative to an airfoil;
activating a shape memory alloy actuator coupled between the airfoil and the deployable device;
moving the deployable device relative to the airfoil in response to activating the shape memory alloy actuator;
engaging the shape memory alloy actuator with the deployable device to move the deployable device during a first mode of operation; and
disengaging the shape memory alloy actuator from the deployable device during a second mode of operation.

17. The method of claim 16 wherein the steps of engaging and disengaging the actuator with the deployable device during respective first and second modes of operation comprise:
disengaging the actuator from the deployable device over a first range of motion of the actuator; and
engaging the actuator with the deployable device over a second range of motion of the actuator.

18. The method of claim 16 wherein the steps of engaging and disengaging the actuator with the deployable device during respective first and second modes of operation comprise:
engaging the actuator while the actuator moves at a first speed; and
disengaging the actuator while the actuator moves at a second speed.

19. The method of claim 12 further comprising the steps of:
locking the deployable device in a deployed position;
allowing the shape memory alloy actuator to return to a relaxed state when the deployable device is in the deployed position.

20. The method of claim 19 further comprising the steps of:
unlocking the deployable device from the deployed position;
returning the deployable device to a stowed positioned using a return mechanism.

\* \* \* \* \*